United States Patent [19]
Lundh

[11] 4,150,636
[45] Apr. 24, 1979

[54] DEEP WATER BERTHING SYSTEM FOR VERY LARGE CARGO CARRIERS

[75] Inventor: Roy W. Lundh, Glendora, Calif.

[73] Assignee: Roy Walfrid Poseidon Marketing & Development Co., Glendora, Calif.

[21] Appl. No.: 853,011

[22] Filed: Nov. 16, 1977

Related U.S. Application Data

[63] Continuation-in-part of Ser. No. 652,281, Jan. 26, 1976, abandoned.

[51] Int. Cl.² .............................................. B63B 21/00
[52] U.S. Cl. ........................................ 114/230; 9/8 P; 52/731; 141/279; 141/387
[58] Field of Search ................. 114/230, 293; 137/236; 141/387, 388, 279; 9/8 P; 52/727, 731

[56] References Cited

U.S. PATENT DOCUMENTS

| 3,465,374 | 9/1969 | Johnson et al. ........................... 9/8 P |
| 3,472,293 | 10/1969 | Bily ..................................... 114/230 X |
| 3,602,175 | 8/1971 | Morgan et al. ....................... 114/293 |

Primary Examiner—Trygve M. Blix
Assistant Examiner—Sherman D. Basinger

[57] ABSTRACT

An off-shore berth for a ship, particularly a tanker, is described in which roll, pitch and yaw are neutralized. The ship is tautly attached to barges, one on either side, and a beam under the ship's keel is coupled to the barges. The beam is tethered to a permanent anchor in the sea floor.

2 Claims, 7 Drawing Figures

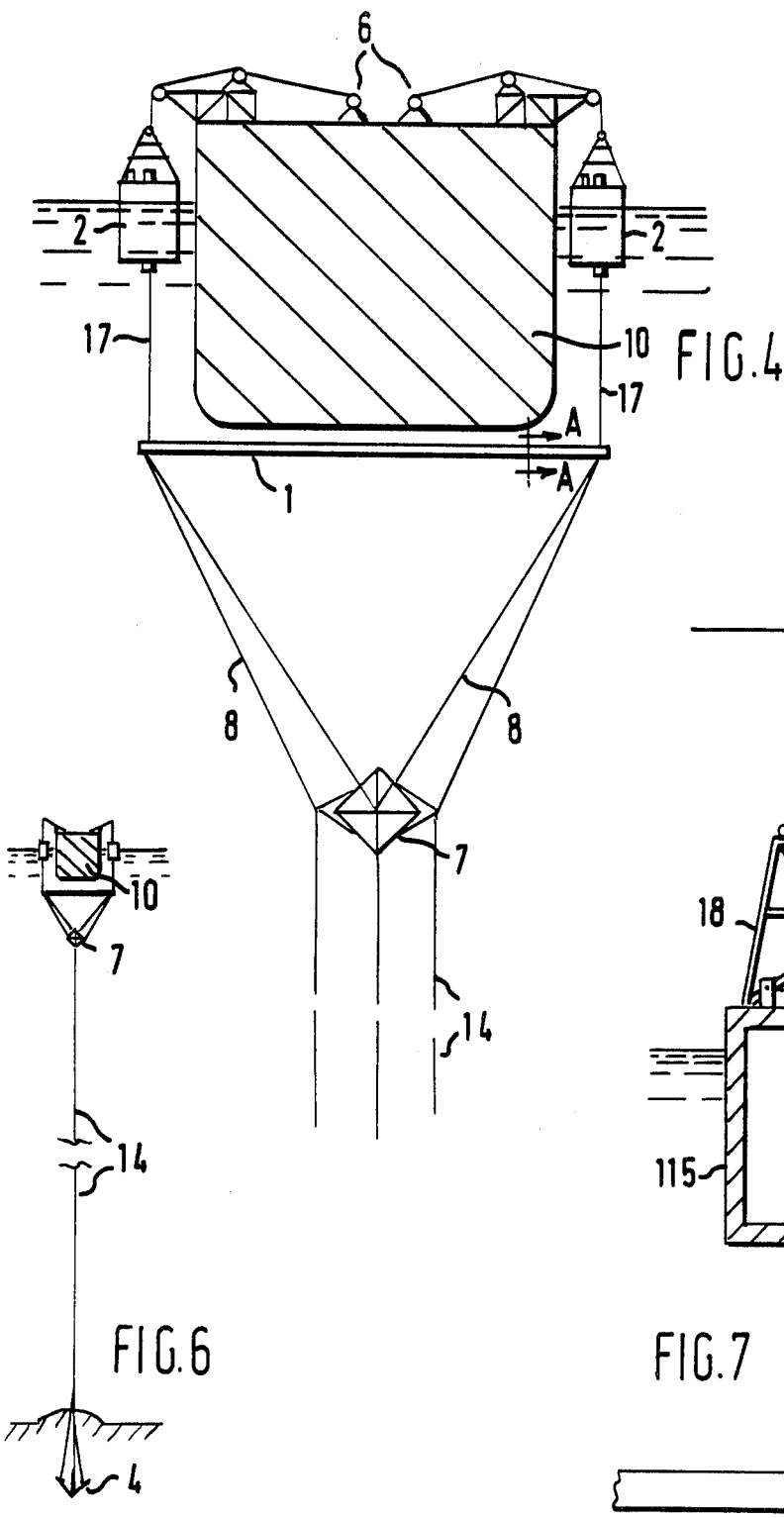

DEEP WATER BERTHING SYSTEM FOR VERY LARGE CARGO CARRIERS

This invention is a continuation-in-part of Ser. No. 652,281 filed by Roy W. Lundh on Jan. 26, 1976, now abandoned, and Assigned to the Poseidon Marketing and Development Co., a Corporation of the State of Delaware.

BACKGROUND OF THE INVENTION

The present invention relates to a permanent berth for ships at a distance from the shore. The invention is particularly but not exclusively concerned with berths for tankers.

Existing harbors are plagued with many problems that have lately arisen with the advent of very large cargo carriers. It has become necessary to devise a new system for anchoring very large tankers at locations which are more or less remote from existing ship traffic in order to reduce the hazards of fires, explosions, rammings, collisions and the necessity of deepening existing harbors or erecting jetties which reach out into deep water. Both these latter expedients are not only very expensive but they ignore most of the hazards mentioned above. Since very large cargo carriers are so poorly maneuverable they pose a constant threat to other ship traffic. Rammings and collisions with attendant fires and explosions are a frequent testimony to these problems.

Accordingly it is an important object of the invention to provide a berth which can be located in deep water, if necessary, away from heavy maritime traffic and where the serious damage associated with fires can be confined.

Another object of the invention is to provide a berth which holds a tanker virtually immobile while loading and unloading liquid cargo. Achievement of this object allows a wide variety of locations for a port facility to be used which would not otherwise be available.

Other objects include providing a berth in which the roll, pitch and yaw of a berthed ship are neutralized.

SUMMARY OF THE INVENTION

In accordance with the invention there is provided an off-shore berth for a ship comprising first and second barges spaced apart from one another to provide a berthing space for ships, each barge having means for mooring a ship thereto, a keel beam, adjustable coupling means for coupling the keel beam between the barges but below the keel of a ship moored between the barges, and a permanent anchor means coupled to the keel beam.

The adjustable coupling means is employed to bring the keel beam loosely into contact with the ship's keel and the ship is moored by winches on its superstructure coupling the ship tightly to the barges at points substantially mid-way along the length of the ship.

This manner of seizing the ship to the anchor means allows a counterforce to be generated to neutralize the effect of such ship movement as a roll, a pitch or of a yaw. A broach is of little consequence. Roll is neutralized by requiring opposite barges of the pair of barges to act in such a manner that one barge is lifted from the surface of the sea while at the same time its opposite number is being submerged. In a very similar manner the bow of a pitching ship must counteract the stern since the ship is seized at midpoint between the bow and the stern.

A normal yawing movement is described as the angular displacement of the longitudinal axis of a bow tethered ship. As described above the point of seizure is not the bow but a point at the center of the ship. The anchored ship would pivot except that a quartering wind strikes bow and stern with equal force.

The system is particularly designed to be used in deep water and a minimum depth of 50 fathoms is required. Sheltered water is a desirable but not altogether a necessary requirement. Loading or unloading on a stormy sea can always be deferred to more clement weather.

The anchor means may comprise a permanent anchor, preferably that described in U.S. Patent specification No. 4,033,281 which discloses a permanent extra heavy duty embedment type of anchor of great holding power. The permanent anchor is preferably attached to buoyancy means, also as described in the above mentioned patent specification, the buoyancy means being attached by first cables to the permanent anchor, and the keel beam being attached by second cables to the buoyancy means.

When tankers or other bulk carriers are to be unloaded, the berth of the invention may also include an anchor station having a buoy attached to one end of a pipeline, the buoy having means for lifting the pipeline at a point near the said end, and positive-buoyancy means attached to the pipeline between the said end and the said point.

The concurrent development of a large diameter flexible marine pipeline allows a tanker to empty its cargo or to fill as the case may be and effect a very rapid turn around.

In accordance with a further aspect of the present invention there is provided a method of berthing a ship including the steps of positioning the ship between two barges fixed to the sea floor by permanent anchor means, adjusting a keel beam between the two barges so that the beam is under the keel of the ship, adjacent and transverse thereto, and tautly mooring the ship to the barges at points substantially midway along the ship.

The method may additionally include coupling a pipeline to a pipe on the ship by raising one end of a submerged pipeline, having positive buoyancy means attached thereto, to the surface of the sea, coupling the end to the said pipe, and lowering the said end to a depth determined by the said pipe and the said positive buoyancy means.

The foregoing and other objects, features and advantages of the invention will be apparent from the following more particular description of the preferred embodiments of the invention, as illustrated in the accompanying drawings.

BRIEF DESCRIPTION OF THE DRAWINGS

In the drawings,

FIG. 4 is a schematic end view of a ship in the berth of FIG. 1, FIG. 6 shows how a permanent anchor is attached to the berth of FIGS. 1 and 4, and FIG. 7 is a cross-section of a barge forming part of the berth of FIGS, 1, 4 and 6.

The diversities of functions of this specification is better comprehended from the following list os elements and the use of each element:

| Element | Its Use |
| --- | --- |
| 1. Keel Beam | Essential part of transferring a variety of forces acting on the ship to permanent anchor. |
| 2. Buoyant Steel Barge | A key element in inhibiting the roll of a ship. |
| 3. Steel Buoy | A method for retrieval of the free end of a flexible pipeline. |
| 4. Extra Heavy Duty Anchor | A permanent embedment type anchor. |
| 5. Flexible Heavy Duty Pipeline | A very large diameter pipeline for the transfer of liquids. |
| 6. Winch | A means of seizing ship to the anti-roll barge 2. |
| 7. Buoyant Octahedron | Holds anchor cables vertically taut. |
| 8. Nylon Rope | A means of holding the barge 2 in a perpendicular relationship to the keel beam 1 to locate and identify the position of the keel beam. |
| 9. Concrete buoy | Retrieves pipeline to surface. |
| 10. Tanker | To be loaded or unloaded. |
| 11. Stinger pipe | Inlet/outlet connection permanently fixed to tanker. |
| 12. End coupling of pipe line | To couple pipe line to stinger pipes. |
| 13. Chain | To raise end of pipeline to surface. |
| 14. Cables | Tethering octahedron to anchor. |
| 15. Low pressurised outer triangle of keel beam | Together form strong composite beam (Internal gas or liquid pressure increases strength of each member). |
| 16. High pressurised inner triangle of keel beam | |
| 17. Chain | Couples barge to keel beam. |
| 18. Superstructure of barge | For mooring barge firmly to tanker. |
| 19. Steel pipe in barge | For a chain attached to the beam. |

DESCRIPTION OF PREFERRED EMBODIMENTS

Figure 1:
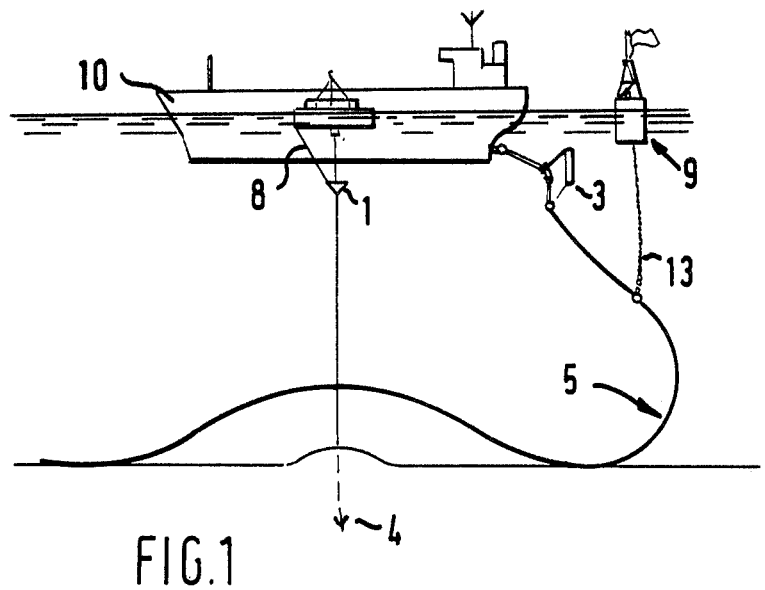
FIG. 1 shows a schematic side view of a ship in a berth according to one embodiment of the invention.

In FIG. 1, an anchored tanker 10 is seized to a permanent anchor 4 of the type described in U.S. Patent Specification No. 4,033,281 by way of a keel beam 1 and buoyant steel barges 2. A flexible pipeline 5 is employed in transporting liquid cargo to or from a more or less distant shore. The terminal portion of the pipeline is seized to an end coupling 12 and is made partially buoyant by a concrete buoy 9 and a steel buoy 3. In FIG. 1 the end coupling is in its loading or unloading position below the surface.

Figure 2:
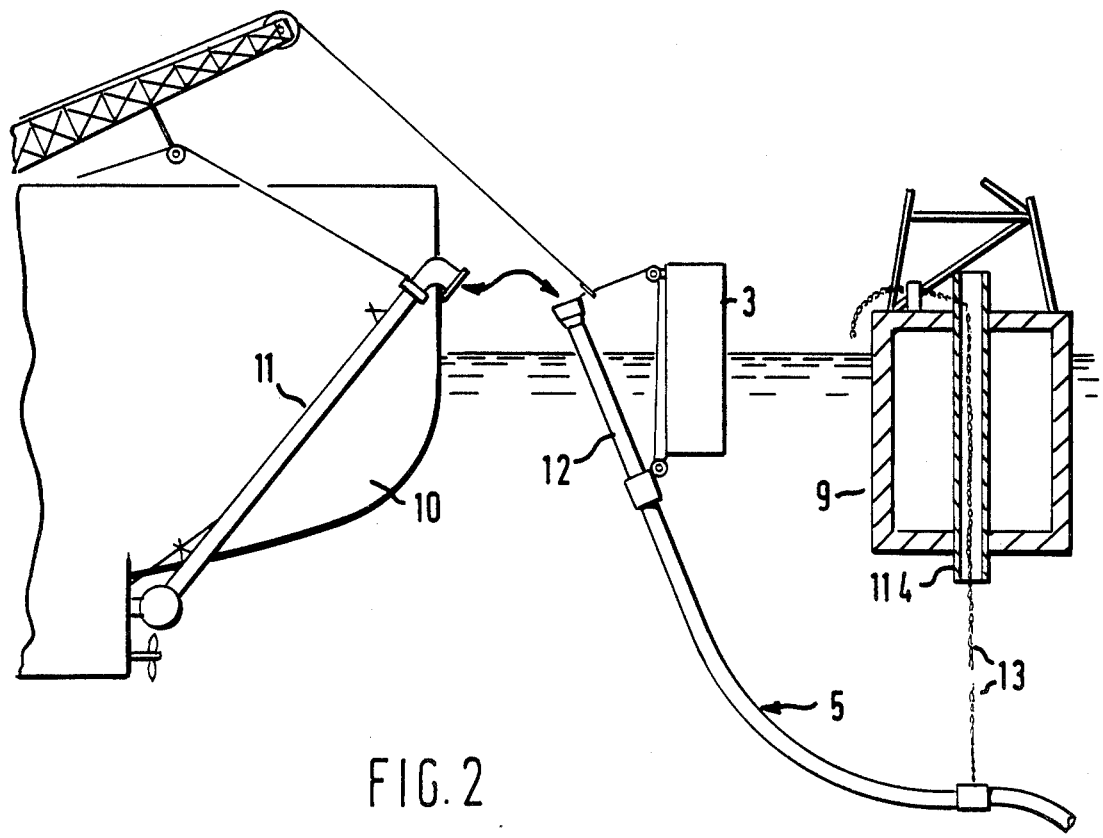
FIG. 2 shows how flexible pipeline is coupled to a berthed ship for loading or unloading.

FIG. 2 reveals the method of mating the pipeline to a rigid stinger pipe 11 which is permanently attached to the tanker. The end coupling 12 of the pipeline is first brought to the surface by means of a chain 13 running in a steel pipe 114 in the buoy 9. The stinger pipe 11 is then bolted to the coupling 12, and the chain 13 is fed out to allow the pipe to reach operational depth as shown in FIG. 1.

Figure 3:
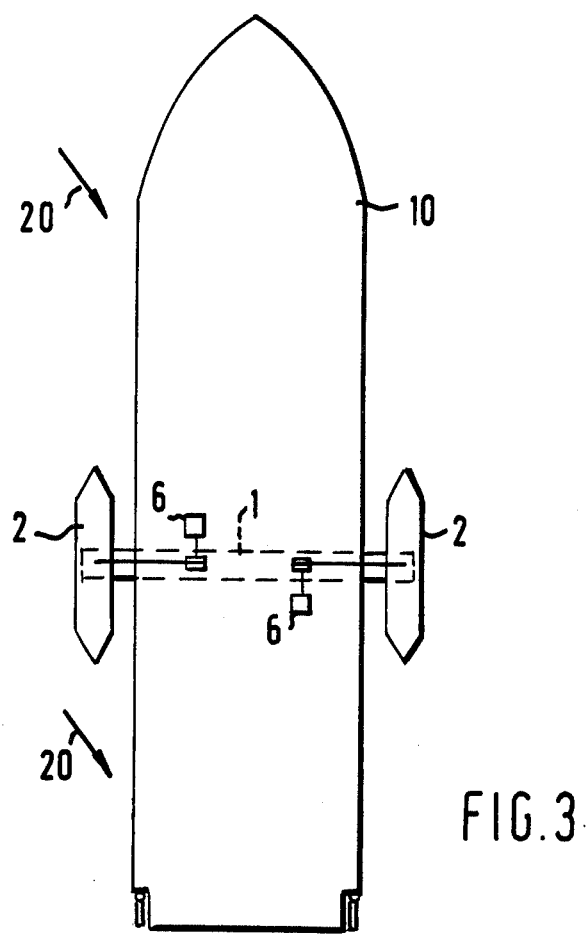
FIG. 3 is a schematic plan view of a ship in the berth of FIG. 1 and shows the relationship of a berthed ship to a quartering wind.

FIG. 3 shows the relationship between the tanker 10, the keel beam 1, the barges 2 and deck winches 6 which are used to create a taut connection to the barges while the tanker is in harness. The tanker is fixed at the midpoints of its sides and the relationship between the berth, the anchoring system and the tanker is depicted. FIG. 3 also shows a quartering wind (by means of arrows 20) being neutralized by acting with equal force on the bow and the stern of the tanker so that the tanker remains motionless.

FIG. 4 is a detailed view of the harness formed by the barges 2 and the keel beam 1. The keel beam 1 is attached to a buoyant octahedron 7 of the type described in the above mentioned U.S. specification by means of nylon ropes 8 and the octahedron is attached to the permanent anchor 4 by cables 14.

Figure 5:
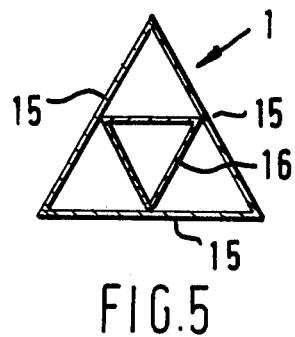
FIG. 5 is a cross-section on the line A—A of a keel beam of FIGS. 1 and 4.

A cross-section of the beam 1 on the line A—A of FIG. 4 is shown in FIG. 5. The beam 1 has an outer sub-beam having a surface 15 forming a triangle in cross section. The outer sub-beam is made of a metal such as aluminium which is resistant to corrosion by sea water. Inside is another sub-beam 16 formed from high tensile steel and also having an outer surface forming a triangle in cross section. The inner triangle fits snugly inside the outer with its apices against the mid-points of the sides of the outer triangle. Thus a strong composite beam is formed which is made stronger by making both inner and outer sub-beams airtight and increasing the pressure in both to above atmospheric pressure.

FIG. 6 gives some idea of the great depth of the anchor 4 which is at least 50 fathoms.

One of the barges 2 is shown in cross section in FIG. 7. The hull 115 is of steel and a steel pipe 19 allows a chain 17 attached to the keel beam to reach the deck of the barge. In operation the keel beam is kept loosely in contact with the ship's keel and the required adjustment is carried out by drawing the chain 17 through the pipe 19. Use is made of a slot in the top of the center pipe 19 to hold the chain 17 between a selected pair of links. The loose ends of the chain is then bolted to the deck to make the linkage secure.

A superstructure 18 runs both the width of the barge and also most of the barge length and is cross braced to give sufficient strength. The barge has wedge shaped ends to allow the tanker to slip more easily into the harness. The barges and buoys are illuminated and display marker flags to locate the position of the submerged keel beam.

While the invention has been particularly shown and described with reference to the preferred embodiments thereof it will be understood by those skilled in the art that various changes in form and detail may be made therein without departing from the spirit and scope of the invention.

What is claimed is:

1. An off-shore berth for a ship comprising first and second barges spaced apart from one another to provide a berthing space for ships, each barge having means for mooring a ship thereto, a keel beam, adjustable coupling means for coupling the keel beam between the barges but below the keel of a ship moored between the barges, and a permanent anchor means coupled to the keel beam, and wherein the keel beam comprises an exterior sub-beam of triangular cross-section and an interior sub-beam also of triangular cross-section within the exterior sub-beam, the apices of the interior sub-beam triangular cross-section being in contact with the sides of the triangular cross-section of the exterior sub-beam at substantially the mid points of the said sides.

2. A berth according to claim 1 wherein both the interior and exterior sub-beams are covered with metal skins and each is adapted to contain a gas or fluid under pressure thereby giving added strength to the sub-beams.

* * * * *